Jan. 30, 1923.
J. LEDWINKA.
CHANNEL STRUCTURE FOR TONNEAU PANELS.
FILED FEB. 27, 1919.
1,443,484.
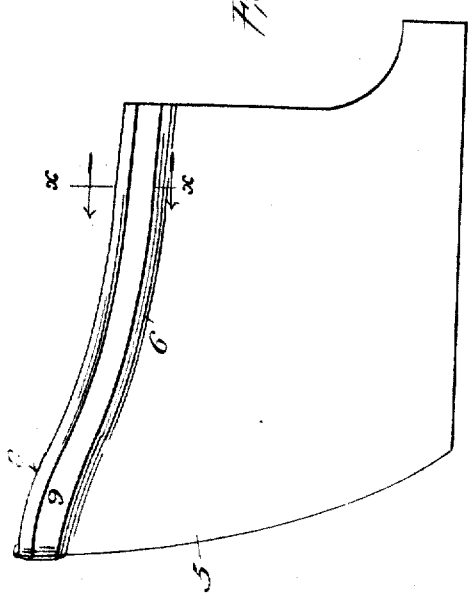
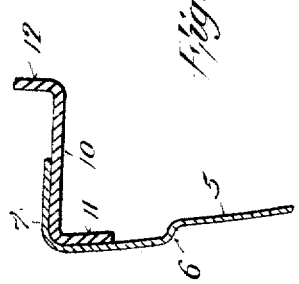
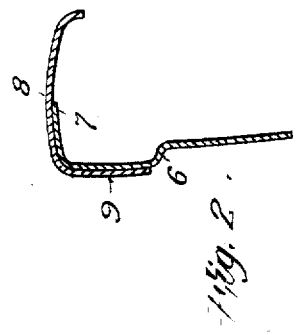
Inventor
Joseph Ledwinka
by his atty Samuel E. Darby Patented Jan. 30, 1923.

1,443,484

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

CHANNEL STRUCTURE FOR TONNEAU PANELS.

Application filed February 27, 1919. Serial No. 279,593.

*To all whom it may concern:*

Be it known that I, JOSEPH LEDWINKA, a citizen of the United States, residing at Philadelphia, in the county of Philadelphia, State of Pennsylvania, have made a certain new and useful Invention in Channel Structures for Tonneau Panels (Case F), of which the following is a specification.

This invention relates to channel structures for tonneau panels, and particularly to the structure for channels employed at the upper edge of a tonneau or seat back panel for automobiles.

The object of the invention is to provide a channel structure for the upper edge of a tonneau or seat back panel which is strong and durable, neat and sightly and affords a distinctive finish for such upper edge, and at the same time forming a convenient means for the application and attachment of the upholstery to the panel.

Further objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

Fig. 1 is a view in side elevation of an automobile tonneau or seat back panel having a channel structure applied thereto in accordance with my invention.

Fig. 2 is a broken view in vertical section through the upper edge of the panel on the line X, X, Fig. 1.

Fig. 3 is a view similar to Fig. 2 showing a slightly modified arrangement embodying the principles of my invention.

In the drawing reference numeral 5 designates a tonneau or seat back panel for automobiles. This panel may be of any suitable material and may be stamped or bent to any desired shape, style or outline. A sheet steel panel well serves the purpose. At its upper edge the panel 5 is bent or offset outwardly as indicated at 6, although this feature is not essential. The extreme upper edge of the panel is bent or folded over laterally and inwardly to form a flange 7. Applied to the upper edge of the panel, formed as above described, is a channel member 8. This channel member is formed of a sheet steel stamping. In the arrangement shown in Fig. 2 the channel member 8 is in the form of an inverted channel which fits over and rests upon the inturned lateral flange 7 of the panel 5, one edge 9 of said channel fitting against the exterior surface of the panel adjacent its upper edge, or against the exterior surface of the offset portion 6 where the panel is formed with such an offset portion.

In the arrangement shown in Fig. 3 the member 10 is of substantially Z-shape in cross section, one edge of which fits into the interior angle formed by bending over lateraly the flange 7 of the panel, the edge flange portion 11 of the member 10 fitting against the interior surface of the panel, or of the offset portion 6 where such offset portion is employed, and the other flange 12 of the said member opens upwardly.

In either of the arrangements of Figs. 2 or 3 the channel member 8 or the member 10, as the case may be, the panel and flange are secured together by welding or otherwise.

From the foregoing description it will be seen that I provide an exceedingly simple and efficient channel structure for the upper edge of a tonneau or seat back panel or body which is economical to manufacture and which is strong and durable and presents a neat and sightly appearance. The channel structures described also afford accommodation for the application to the panel of the usual upholstery or cushioning.

Having now set forth the objects and nature of my invention and constructions embodying the principles thereof, what I claim as new and useful and of my own invention and desire to secure by Letters Patent is:—

1. The combination with a sheet metal panel bent or stamped into the required shape and curvature to form the sides and back of a tonneau or seat, and having a laterally extending flange at its upper edge, of a member conforming longitudinally to the curvature of the panel and applied to said flange and having a portion thereof engaging and secured to the side surface of the panel, said member forming a seat for the application of upholstery.

2. The combination with a sheet metal panel bent or stamped into the required shape and curvature to form the sides and back of a tonneau or seat, and having a laterally extending flange at its upper edge, of a member applied against and secured to said panel at the angle formed by said flange and body to afford a seat to receive the upholstery, said member being curved longitudinally to conform to the curvature of said panel.

3. The combination with a sheet metal panel bent or stamped into the required shape and curvature to form the sides and back of a tonneau or seat, and having an inturned laterally extending flange at its upper edge, of a channel member longitudinally bent or stamped to conform to the curvature of the upper edge of the panel and applied against and secured to the said inturned flange, and having one edge thereof applied to the exterior surface of the panel adjacent the angle of said flange and panel, and forming a downwardly opening channel to receive the upholstery.

4. In an automobile body, the combination with a sheet metal panel curved to form the sides and back of a seat, said panel having a laterally-extending flange at its upper edge, of an upholstery receiving member curved longitudinally to conform to the curvature of the upper edge of said panel, said member having a vertical portion applied and rigidly secured to the upper, vertical portion of said panel and a horizontal portion applied and rigidly secured to the lateral flange and extending inwardly of the body therefrom to form means for receiving and retaining detachable upholstery.

In testimony whereof I have hereunto set my hand on this 24th day of February, A. D. 1919.

JOSEPH LEDWINKA.